(12) United States Patent
Carminati et al.

(10) Patent No.: US 10,914,938 B2
(45) Date of Patent: Feb. 9, 2021

(54) OSCILLATING STRUCTURE WITH REDUCED DYNAMIC DEFORMATION, OPTICAL DEVICE INCLUDING THE OSCILLATING STRUCTURE, AND METHOD OF MANUFACTURING THE OSCILLATING STRUCTURE

(71) Applicant: STMicroelectronics S.r.l., Agrate Brianza (IT)

(72) Inventors: Roberto Carminati, Piancogno (IT); Sonia Costantini, Lecco (IT); Marta Carminati, Casatenovo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 193 days.

(21) Appl. No.: 15/955,107

(22) Filed: Apr. 17, 2018

(65) Prior Publication Data
US 2018/0307038 A1 Oct. 25, 2018

(30) Foreign Application Priority Data
Apr. 20, 2017 (IT) .................................. 10201743616

(51) Int. Cl.
*G02B 26/10* (2006.01)
*G02B 26/08* (2006.01)

(52) U.S. Cl.
CPC ......... *G02B 26/0833* (2013.01); *G02B 26/08* (2013.01); *G02B 26/0816* (2013.01); *G02B 26/10* (2013.01); *G02B 26/105* (2013.01)

(58) Field of Classification Search
CPC ................ G02B 26/08; G02B 26/0816; G02B 26/0833; G02B 26/10; G02B 26/105; B81B 3/007; B81B 2201/042
See application file for complete search history.

(56) References Cited

U.S. PATENT DOCUMENTS 9,122,059 B2 * 9/2015 Honda ................. G02B 7/1821
2004/0120057 A1 * 6/2004 Niendorf ............ G02B 26/0833
359/872

(Continued)

FOREIGN PATENT DOCUMENTS

CN 104166232 A 11/2014
CN 104216108 A 12/2014
(Continued)

OTHER PUBLICATIONS

Examiner provided machine translation of Kitazawa et al., JP 2010128116 A, of record (Year: 2010).*

(Continued)

*Primary Examiner* — Balram T Parbadia
(74) *Attorney, Agent, or Firm* — Crowe & Dunlevy

(57) ABSTRACT

An oscillating structure includes first and second torsional elastic elements that define an axis of rotation and a moving element that is interposed between the first and second torsional elastic elements. The moving element, the first torsional elastic element and the second torsional elastic element lie in a first plane and are not in direct contact with one another. A coupling structure mechanically couples the moving element, the first torsional elastic element and the second torsional elastic element together. The moving element, the first torsional elastic element and the second torsional elastic element lie in a second plane different from the first plane. Oscillation of the moving element occurs as a result of a twisting of the first and second torsional elastic elements.

18 Claims, 5 Drawing Sheets

(56) References Cited

U.S. PATENT DOCUMENTS

| | | |
|---|---|---|
| 2007/0017994 A1 | 1/2007 | Wolter et al. |
| 2010/0302609 A1* | 12/2010 | Huber ................ B81C 1/00142 359/199.4 |
| 2014/0355090 A1* | 12/2014 | Mizutani ............ G02B 26/0858 359/212.1 |
| 2015/0002916 A1 | 1/2015 | Sourani et al. |
| 2015/0168715 A1 | 6/2015 | Vigna et al. |
| 2016/0274354 A1 | 9/2016 | Fujimoto |

FOREIGN PATENT DOCUMENTS

| | | |
|---|---|---|
| EP | 2808296 A2 | 12/2014 |
| EP | 3070508 A1 | 9/2016 |
| JP | 2010060592 A | 3/2010 |
| JP | 2010128116 A | 6/2010 |

OTHER PUBLICATIONS

IT Search Report and Written Opinion for IT Appl. No. 2017000043616 dated Jan. 11, 2018 (8 pages).

Hsu S, et al: "Fabrication and Characterization of a Dynamically Flat High Resolution Micro-Scanner, Journal of Optics A: Pure and Applied Optics," doi: 10.1088/1464-4258/10/4044005, 2008 (8 pages).

First Office Action and Search Report for co-pending CN Appl. No. 201810355632.8 dated Mar. 19, 2020 (9 pages).

\* cited by examiner

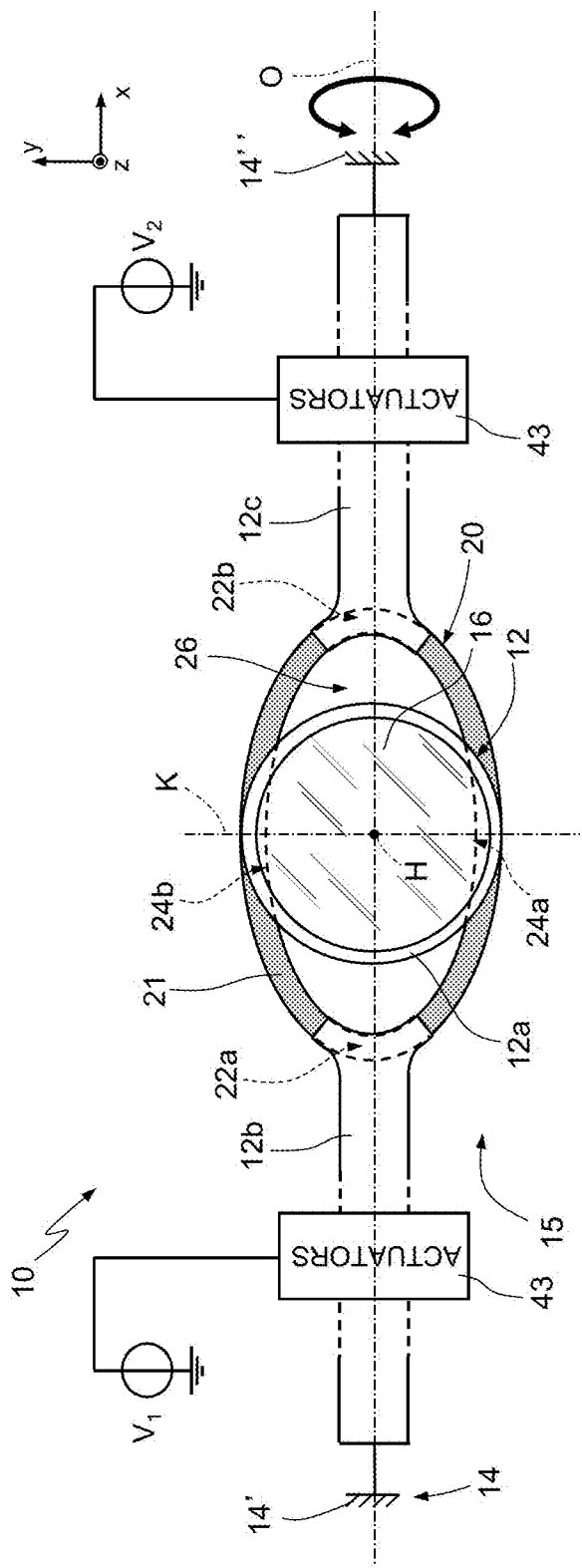
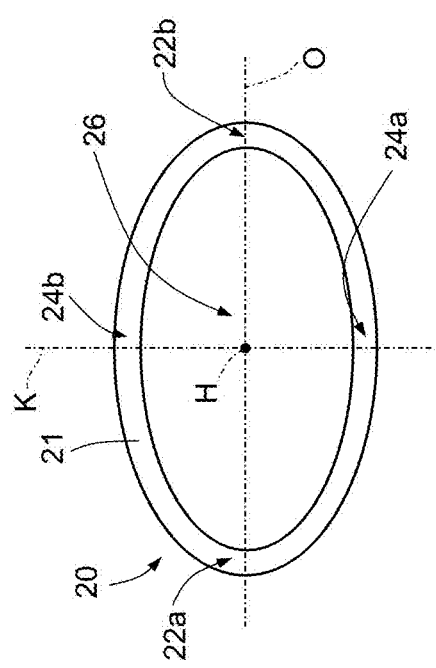
Fig.2
Fig.3

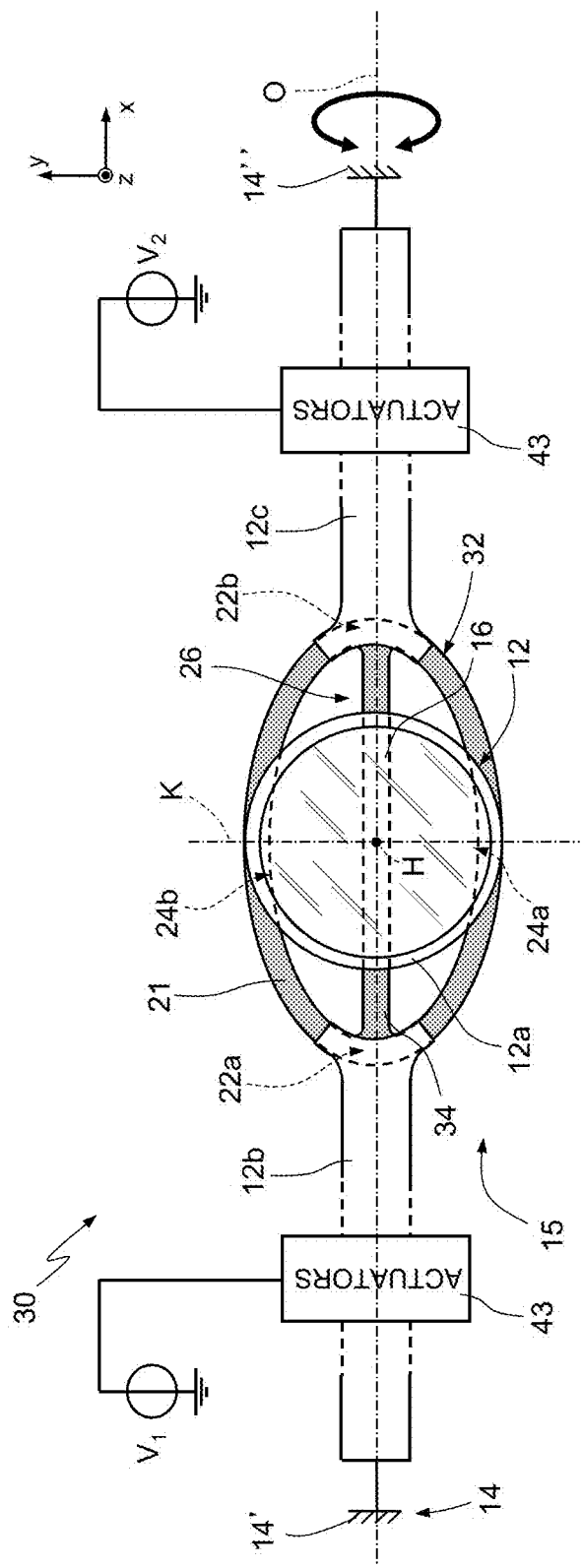
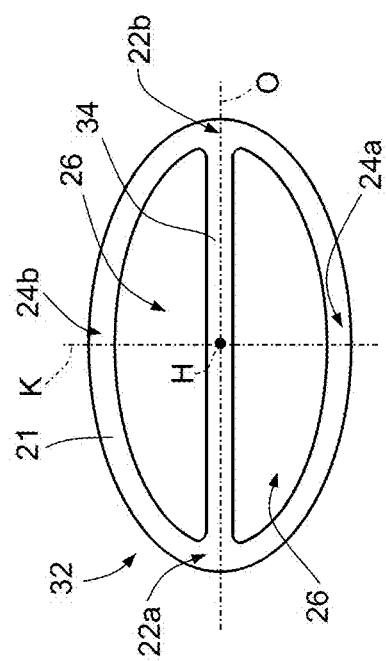
Fig.4
Fig.5

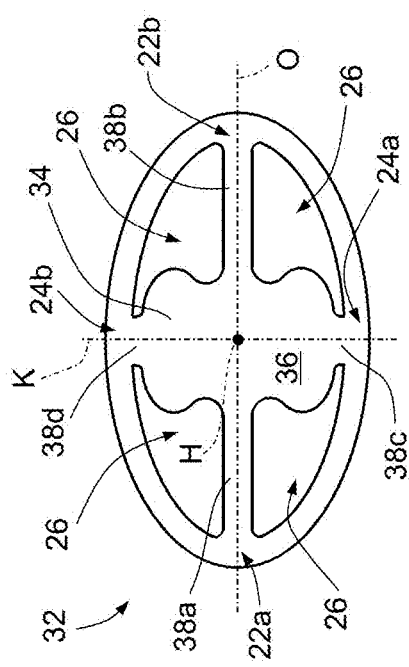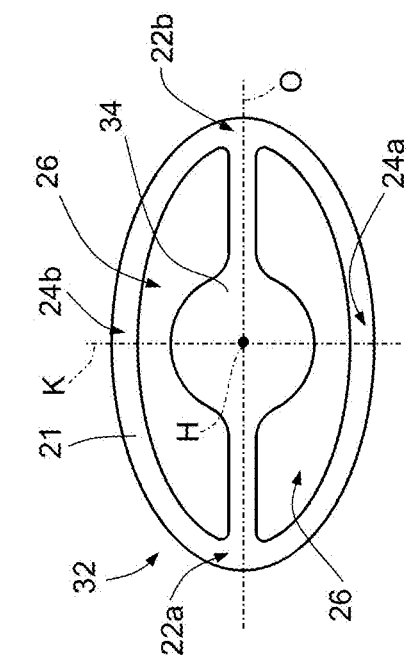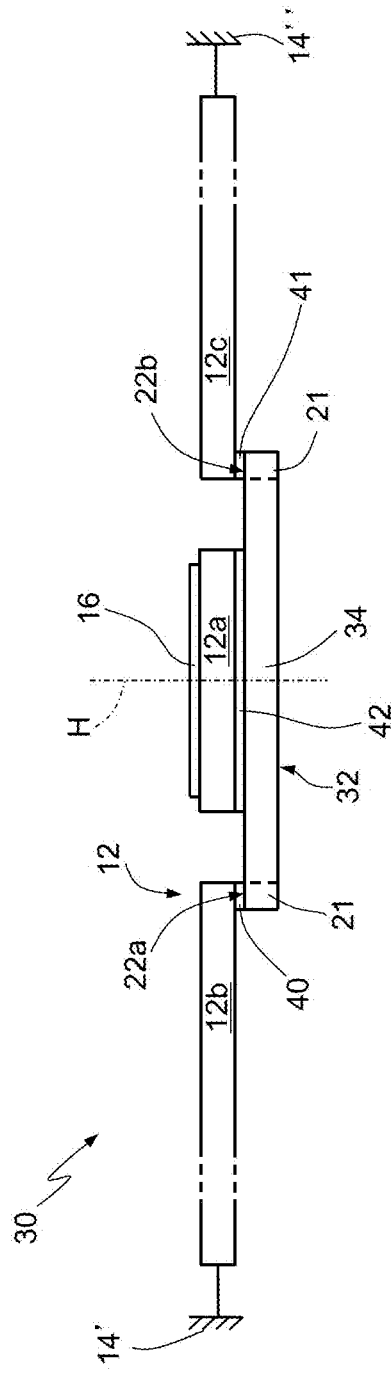

OSCILLATING STRUCTURE WITH REDUCED DYNAMIC DEFORMATION, OPTICAL DEVICE INCLUDING THE OSCILLATING STRUCTURE, AND METHOD OF MANUFACTURING THE OSCILLATING STRUCTURE

PRIORITY CLAIM

This application claims the priority benefit of Italian Application for Patent No. 102017000043616, filed on Apr. 20, 2017, the disclosure of which is hereby incorporated by reference in its entirety to the maximum extent allowable by law.

TECHNICAL FIELD

The present invention relates to an oscillating structure, an optical device including the oscillating structure, and a method of manufacturing the oscillating structure. In particular, the oscillating structure is designed to reduce the dynamic deformation of a moving (oscillating) mass belonging to said oscillating structure. In one embodiment, the moving mass carries a reflective layer and the oscillating structure forms, at least in part, a micro-mirror.

BACKGROUND

Micromechanical mirror structures (or reflectors) made at least partially from semiconductor materials and fabricated using microelectromechanical systems (MEMS) technology are known.

MEMS reflectors are designed to receive an optical beam and to change the propagation direction thereof, periodically or near periodically. For this purpose, MEMS reflectors include moving elements made from planar supports bearing reflective elements, the positions of which in space are controlled electrically using appropriate oscillation control signals.

More specifically, in a generic MEMS reflector including a respective planar support provided with the reflective element, controlling the position of the reflective element is particularly important to enable a portion of space to be scanned with an optical beam falling on the mirror. In particular, controlling the position of the reflective element is of key importance for resonant MEMS reflectors in which, when in use, the planar support is oscillated substantially periodically about an idle position. The oscillation frequency is as close as possible to the resonance frequency of the planar support in order to maximize the angular distance covered by the reflective element during each oscillation, thereby maximizing the size of the portion of space scanned.

The high oscillation frequency causes accelerations of the planar support. Since the planar support is usually a thin layer having a circular or oval shape, the moment of inertia thereof and the limited rigidity cause a dynamic deformation, which results in a deformation of the planar support and of the reflective element.

In particular, it has been determined that, for oscillation frequencies greater than 15 kHz and in the case of planar supports with a diameter exceeding 1 mm, even a deformation of a few tenths of nanometers (greater than 60 nm) of the reflective element degrades the optical performance of the MEMS reflector, causing aberrations in the projected image.

This unwanted effect increases as the oscillation frequency increases. Known solutions increase the rigidity of the planar support by increasing the thickness of same. However, this increase in mass requires greater actuation forces for the MEMS reflector.

Other known solutions, for example those described in United States Patent Application Publication No. 2007/0017994 (incorporated by reference), increase the rigidity of the planar support using anchors coupled to the planar support at a plurality of points corresponding to the edges of the planar support, that are coplanar with same. The anchors partially or fully surround the planar support and increase the area of the moving portion of the MEMS reflector. Structures of this type increase the manufacturing complexity of the MEMS reflector and the increased area of the moving portion results in an unwanted damping of the oscillation, making it more difficult to achieve high oscillation frequencies.

There is a need in the art to at least partially address the problems affecting known micromechanical mirror structures and provide an oscillating structure with reduced dynamic deformation, an optical device including the oscillating structure, and a method for manufacturing the oscillating structure with reduced dynamic deformation.

SUMMARY

In an embodiment, an oscillating structure includes: first and second torsional elastic elements defining an axis of rotation, a moving element interposed between said first and second torsional elastic elements, the moving element being configured to rotate about an axis of rotation as a result of a twisting of the first and second torsional elastic elements, wherein the moving element, the first torsional elastic element and the second torsional elastic element lie on a first plane and are separated from one another. The oscillating structure further comprises a coupling structure lying on a second plane different from said first positioning plane, said moving element, said first torsional elastic element and said second torsional elastic element being mechanically coupled together by means of the coupling structure.

In an embodiment, a method for manufacturing an oscillating structure includes the steps of: forming first and second torsional elastic elements defining an axis of rotation, and forming a moving element between said first and second torsional elastic elements, the moving element being configured to rotate about an axis of rotation as a result of a twisting of the first and second torsional elastic elements, wherein the moving element, the first torsional elastic element and the second torsional elastic element are lying on a first plane, and wherein the first torsional elastic element, the second torsional elastic element and the moving element are arranged at a distance from one another. The method further includes the steps of: forming a coupling structure in a second plane other than said first plane, and mechanically coupling the moving element, the first torsional elastic element and the second torsional elastic element together using the coupling structure.

BRIEF DESCRIPTION OF THE DRAWINGS

The present invention is further described below with reference to preferred embodiments of same, which are provided purely as non-limiting examples, and to the attached drawings, in which:

FIG. 2 shows a MEMS device, in particular an oscillating micro-mirror structure, according to one embodiment, FIG. 3 shows a support and coupling structure that is part of the MEMS device in FIG. 2, FIG. 4 shows a MEMS device, in particular an oscillating micro-mirror structure, according to another embodiment, FIG. 5-7 show respective embodiments of the support and coupling structure that are alternatives to the embodiment in FIG. 2, FIG. 8 shows a cross section of the oscillating micro-mirror structure in FIG. 4, and FIGS. 9-12 show cross sections of working phases of an SOI wafer to form the oscillating micro-mirror structure in FIG. 8.

DETAILED DESCRIPTION

Figure 1:
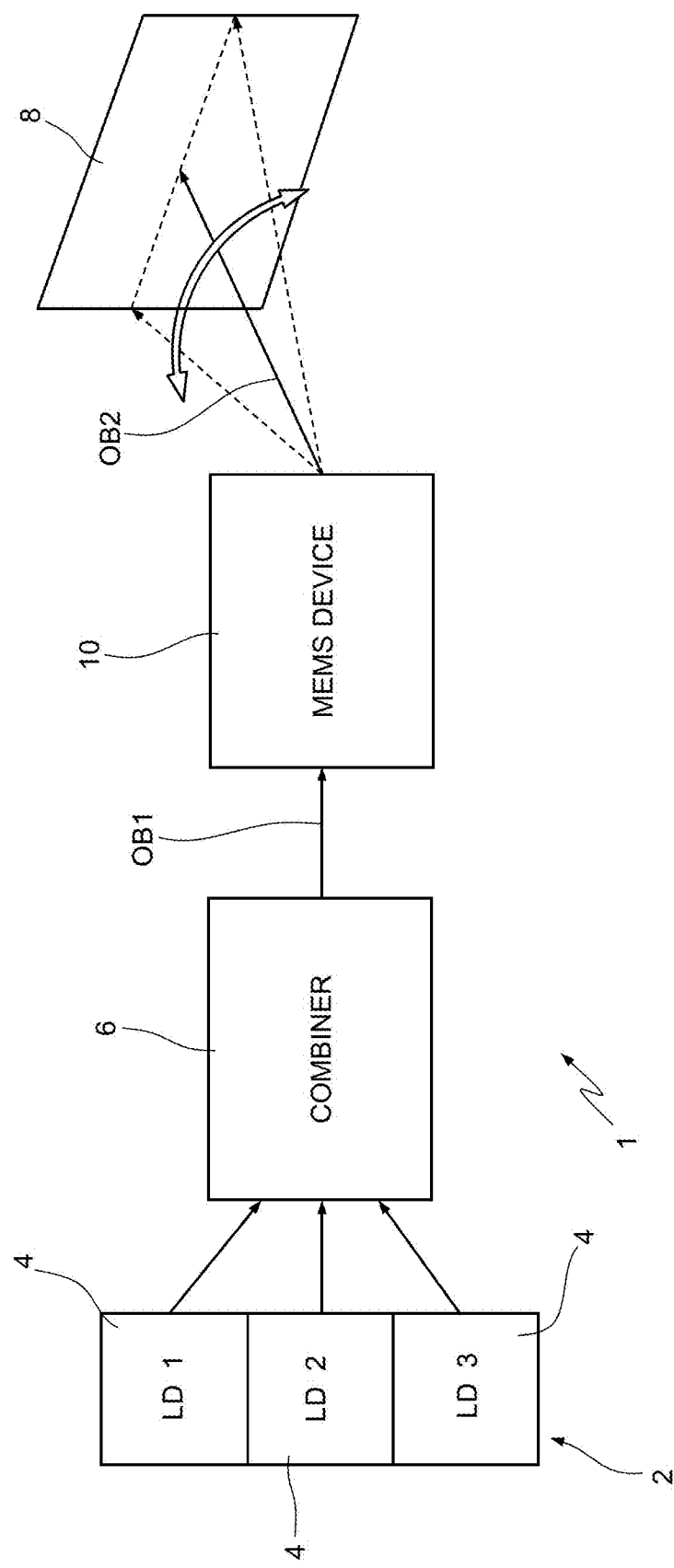
FIG. 1 is a block diagram of an optical projection system including an oscillating structure provided with a reflective layer.
Figure 9:

FIG. 1 shows a MEMS projection system 1 that includes a light source 2 formed for example by a plurality of laser diodes (LD) 4, each of which emits electromagnetic radiation at a corresponding wavelength. For example, FIG. 1 shows three LDs 4, each of which emits radiation respectively in the red range (620-750 nm), green range (495-570 nm) and blue range (450-475 nm).

The MEMS projection system 1 also includes a combiner 6, a MEMS device 10 (in particular an oscillating structure such as a micro-mirror), and a screen 8. The combiner 6 is arranged downstream of the light source 2, such as to receive the electromagnetic radiation emitted by the LDs 4 to form a single optical beam OB1, obtained by combining said electromagnetic radiation. The combiner 6 is also designed to direct the optical beam OB1 towards the MEMS device 10. The MEMS device 10, which is described in greater detail below, is in turn designed to generate a reflected optical beam OB2 and to send the reflected optical beam OB2 to the screen 8, to enable the formation of images on the screen 8.

More specifically, the MEMS device 10 is designed to vary the spatial orientation of the axis of the reflected optical beam OB2 over time such as to periodically scan portions of the screen 8. In particular, the reflected optical beam OB2 performs a linear scan of a portion of the screen 8, and potentially all of same. It is evident that the MEMS device 10 can be used in systems other than the system shown in FIG. 1.

FIG. 2 shows an embodiment of the MEMS device 10, in particular an oscillating structure such as a micromechanical mirror structure, or micro-mirror. The MEMS device is made using MEMS techniques from the semiconductor industry.

The MEMS device 10 includes a static support body 14, in particular made of semiconductor material, that includes first and second fastenings regions 14', 14".

The MEMS device 10 is shown in an orthogonal reference system formed by three Cartesian axes X, Y, Z that are orthogonal to one another. An axis H parallel to the axis Z of the reference system is also provided. The first and second fastenings regions 14', 14" are arranged diametrically opposite one another about the axis H and are aligned with one another along an axis O parallel to the axis X. The static support body 14 defines a cavity 15. The MEMS device 10 also includes a moving mass 12 that is linked to the first and second fastenings regions 14', 14" and is also suspended above the cavity 15.

The moving mass 12, when idle, is substantially parallel to a horizontal plane XY.

The moving mass 12 has a central portion 12a that is, for example, circular in the plan view (in the horizontal plane XY) and that is, for example, between 50 μm and 200 μm thick and that has a diameter of between 1 mm and 2 mm, and a mirror layer 16 that lies on the central portion 12a and that is, for example, between 0.05 μm and 0.3 μm thick. The mirror layer 16 incorporates a material with high reflectivity for the light radiation to be projected, for example aluminum or gold. Elastic elements 12b, 12c, in particular torsional elastic elements, that are elongate (arm-shaped) extend from opposing portions of the central portion 12a, in the horizontal plane XY. The elastic elements 12b, 12c lie primarily and in particular along the axis of rotation O, passing through the geometric center of the moving mass 12, which thus forms an axis of rotation for the moving mass 12.

In one embodiment, the thickness of the elastic elements 12b, 12c is the same as the thickness of the central portion 12a. Alternatively, said elastic elements may be thicker or thinner than the central portion 12a as required and as a function of the design parameters, such as the rigidity of the elastic elements 12b, 12c.

The central portion 12a is coupled to the fastening regions 14', 14" respectively by the elastic elements 12b, 12c, which enable the rotation of the central portion 12a outside the horizontal plane XY about the axis of rotation O.

The elastic elements 12b, 12c extend longitudinally along the axis X and the length of same along said axis X is greater than the corresponding width (along the axis Y on the horizontal plane XY) and greater than the corresponding thickness along the axis Z (vertical axis). The length, width and thickness of the elastic elements 12b, 12c are determined as a function of the desired torsional rigidity of same in a known manner.

When in use, actuation of the MEMS device 10 involves, in a known manner, the twisting of the elastic elements 12b, 12c and the consequent rotation of the moving mass 12 outside the horizontal plane XY around the axis of rotation O, as a function of the desired movement to reflect the incident light beam towards the outside of the MEMS device 10.

In a known manner, the moving mass 12 can be actuated in rotation with an oscillating movement at the mechanical resonance frequency of same, in order to maximize the range of the movement thereof.

According to one aspect, the elastic elements 12b, 12c and the central portion 12a are not in direct contact with one another.

The MEMS device 10 also includes a coupling structure 20 illustrated separately in FIG. 3 according to a possible embodiment. The shape of the coupling structure 20 in the plan view (i.e. in the horizontal plane XY) may for example be oval, elliptical, quadrangular with beveled corners, generically polygonal or polygonal with beveled corners. In particular, the coupling structure 20 includes an annular portion 21 that contains one or more through-hole apertures 26.

The thickness along Z of the coupling structure 20 is, in particular, uniform along the entire extension of the coupling structure 20, and is, for example, between 50 μm and 200 μm. Alternatively, the thickness of the coupling structure 20 need not be uniform along the entire extension of the coupling structure 20. In this case, the thicknesses are nonetheless symmetrical about the axis of rotation O.

With reference to FIGS. 2 and 3, according to one aspect, the coupling structure 20 lies in a first positioning plane that is different from but parallel to a second positioning plane in which the central portion 12a and the elastic elements 12b, 12c lie. The first and second positioning planes are parallel to the plane XY. More specifically, the coupling structure 20 lies beneath (along the axis Z) the central portion 12a and the elastic elements 12b, 12c.

In other words, the central portion 12a and the elastic elements 12b, 12c are not mechanically connected to one another (i.e., are not in direct contact) when observed in the first positioning plane. The coupling structure 20 is designed to mechanically couple the central portion 12a and the elastic elements 12b, 12c together in a different positioning plane (second positioning plane). There are coupling interface regions between the first and second positioning planes, as shown in FIG. 8 and described with reference to FIG. 8.

According to one aspect, the elastic elements 12b, 12c and the central portion 12a are coupled together mechanically only by the coupling structure 20.

The elastic elements 12b, 12c are coupled to the coupling structure 20 at the first regions 22a, 22b of the coupling structure 20, diametrically opposite one another about the axis H and aligned with one another along the axis O. The central portion 12a is coupled to the coupling structure 20 at the second regions 24a, 24b of the coupling structure 20, diametrically opposite one another about the axis H and aligned with one another along an axis K perpendicular to the axis O. Consequently, the regions 22a, 22b, 24a, 24b are arranged such as to maximize the distance between same.

In particular, where the annular portion 21 of the coupling structure 20 is elliptical, the regions 22a, 22b, 24a, 24b are arranged at the vertices of a cross formed by the minor axis and the major axis of the ellipse.

Alternatively, where the annular portion 21 of the coupling structure 20 is quadrangular (for example rectangular with beveled corners), the regions 22a, 22b, 24a, 24b include the midpoints of the large and small sides of said quadrangular coupling structure 20.

The coupling structure 20 is designed such that the outer edges of the coupling structure 20, at the second regions 24a, 24b, are arranged above the central portion 12a, and in particular coincide with the respective outer edge portions of the central portion 12a.

FIG. 4 shows a MEMS device 30 according to another embodiment. Elements of the MEMS device 30 that are common with the MEMS device 10 in FIG. 1 are identified using the same reference signs, and are not further described.

The MEMS device 30 includes a coupling structure 32 that is similar to the coupling structure 20 and includes, in addition to the annular portion 21 (already described with reference to the coupling structure 20 and identified here using the same reference sign), a support portion 34 (in this case beam shaped) that is arranged inside the annular portion 21 symmetrically about the axis of rotation O. According to one aspect, the support portion 34 is formed from the same part as the annular portion 21, forming a one-piece structure.

In particular and according to an aspect, the support portion 34 is connected to the annular portion 21 at the first regions 22a, 22b of the coupling structure 32. As shown for example in FIGS. 5 and 6, the support portion 34 is substantially rectangular in the plane XY (FIG. 5) and partially reproduces the shape of the central portion 12a (FIG. 6).

According to another aspect, the support portion 34 is also connected to the annular portion 21 at the second regions 24a, 24b of the coupling structure 32. As shown for example in FIG. 7, the support portion 34 includes a central support body 36 of arbitrary shape that is symmetrical about the axis of rotation O; first and second connection elements 38a, 38b connected between the region 22a and the central support body 36 and respectively between the region 22b and the central support body 36; and third and fourth connection elements 38c, 38d connected between the region 24a and the central support body 36, and respectively between the region 24b and the central support body 36. In particular, the first and second connection elements 38a, 38b are arm-shaped, i.e. same extend in a main direction parallel to the axis of rotation O, while the third and fourth connection elements 38c, 38d lie along the axis K for a length less than the respective width measured orthogonal to the axis K.

Regardless of the embodiment, the moving mass 12 (in particular the central portion 12a) is anchored at least in part to the support portion 34 (in particular, the moving mass 12 is anchored at the intersection between the axes O and K), such that the support portion 34 is used to support the moving mass 12 to prevent unwanted deflection or warping of same.

FIG. 8 is a lateral cross section of the MEMS device 30 taken along the axis of rotation O. As shown in FIG. 8, first and second coupling regions 40, 41 are arranged respectively between the elastic elements 12b, 12c and the annular portion 21 of the coupling structure 32 at the first regions 22a, 22b, and a third coupling region 42 arranged between the moving mass 12 and the support portion 34. The coupling regions 40, 41 and 42 may be made of adhesive such as glue or the silicon oxide layer of a silicon-over-insulator (SOI) substrate.

The MEMS device 10 also includes, in a known manner, actuators designed to generate and maintain an oscillation of the moving mass 12 and of the support structure 20 about the axis O. For this purpose, actuators 43 are operatively coupled to the elastic elements 12b, 12c, or between the elastic elements 12b, 12c and the moving mass 12, or between the elastic elements 12b, 12c and the first and second fastenings regions 14', 14", according to respective embodiments. Actuation of the MEMS device 10 may be piezoelectric or electrostatic. It is nonetheless evident that the actuators 43 may be coupled differently than as shown in the figure.

Since when in use the actuators 43 are designed to trigger and maintain the oscillation of the moving mass 12, each actuator lies, in one embodiment, symmetrically about the axis K passing through the centroid of the moving mass 12 (i.e. through the point of intersection between the axes O and H) and orthogonal to both axes O and H. This prevents the generation of uncontrolled oscillations caused by any asymmetry of the actuators. In use, when the command voltages $V_1$, $V_2$ are applied to the actuators 43, in a known manner, a local deformation occurs in the elastic elements 12b, 12c (torsion), which is transferred directly to the support structure 20, which consequently causes the moving mass 12 to rotate about the axis O.

According to other embodiments, other types of actuation may be provided in addition to piezoelectric and electrostatic actuation, such as magnetic actuation.

A manufacturing method applicable both to the MEMS device 10 and to the MEMS device 30 are described below with reference to FIGS. 9-12. After arranging a wafer 100, for example an SOI wafer, including a substrate 102 of semiconductor material such as silicon, an insulating layer 104, for example of silicon oxide arranged on the substrate 102 and a structural layer 106 made of semiconductor material such as silicone arranged on the insulating layer 104.

Figure 10:
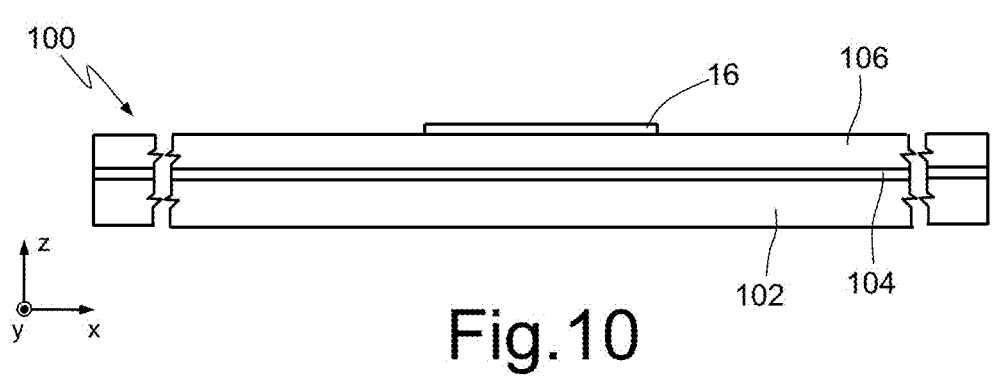

A deposition phase is carried out followed by subsequent lithography and etching phases of the reflective material (for example, aluminum or gold) to form the mirror layer 16, as shown in FIG. 10.

Figure 11:
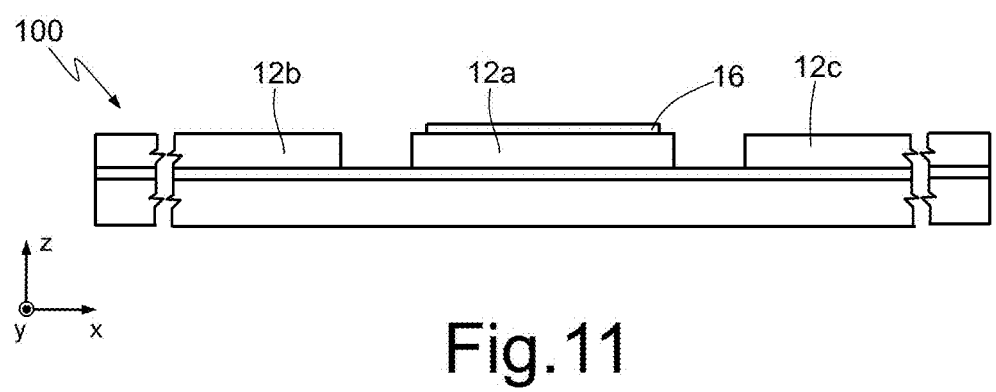

Then, as shown in FIG. 11, the structural layer 106 is etched to remove selected portions of the structural layer 106 to define the desired shape of the central portion 12a and of the elastic elements 12b, 12c. The structural body 106 is etched until the insulating layer 104 is reached, the insulating layer in this case acting as an etch stop layer.

Figure 12:
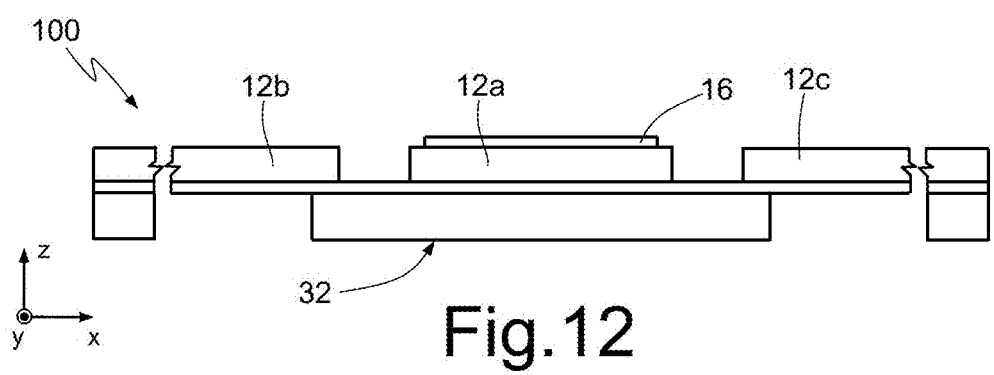

Then, as shown in FIG. 12, an etching phase is carried out from the back of the wafer 100 to remove selected portions of the substrate 102 in order to define the desired shape of the coupling structure 32.

Finally, one or more etchings are performed on the wafer 100 to remove exposed portions of the insulating layer 104 forming the coupling regions 40, 41 and 42, thereby forming the MEMS device 30 shown in cross section in FIG. 8.

The advantages of the solution described are clear from the above discussion.

In particular, the dynamic deformation is considerably reduced since the central portion 12a supporting the reflective element 16 is linked via the coupling region 20 at a plurality of points, including the points furthest away from the axis of rotation O, which are subjected to the greatest acceleration when the MEMS device is in use. This reduces the aberration of the projected image.

Furthermore, the fact that the coupling region 20 lies in a different a plane to the central portion 12a enables the central portion 12a to be linked without increasing the total surface area of the MEMS device, and therefore without increasing the damping of the oscillation. This in turn enables the MEMS device to be operated at higher oscillation frequencies.

The manufacturing process does not require additional process phases compared to traditional solutions and is in particular advantageous when using SOI substrates.

The aforementioned features make the use of the MEMS device 10, 30 particularly advantageous in optical systems built into portable devices.

It is evident that modifications and variations may be made to the subject matter described and illustrated without thereby moving outside the scope of protection of the present invention, as defined in the attached claims.

In particular, the MEMS devices 10, 30 may in general be used in any optical system and portable equipment that requires a light beam to be reflected, with reduced space usage and reduced aberration.

The invention claimed is:

1. An oscillating structure, comprising:
    first and second torsional elastic elements defining an axis of rotation,
    a moving element interposed between said first and second torsional elastic elements, the moving element being configured to rotate about the axis of rotation as a result of a twisting of the first and second torsional elastic elements,
    wherein the moving element, the first torsional elastic element and the second torsional elastic element lie on a first plane and are separated from one another,
    a coupling structure lying in a second plane different from said first plane, wherein said moving element, said first torsional elastic element and said second torsional elastic element are mechanically coupled together by the coupling structure, and
    first, second, and third physical layer structures lying in a third plane between the first and second planes and spaced apart from one another by free space, the first physical layer structure linking the coupling structure with the moving element, the second physical layer structure linking the coupling structure with the first torsional elastic element, and the third physical layer structure linking the coupling structure with the second torsional elastic element.

2. The oscillating structure according to claim 1, wherein said moving element, said first torsional elastic element and said second torsional elastic element are mechanically coupled together exclusively through the coupling structure.

3. The oscillating structure according to claim 1, wherein the second plane of the coupling structure is parallel to the first plane and extends at a height lower than the first plane.

4. The oscillating structure according to claim 1, wherein the coupling structure includes an annular portion that contains one or more through-hole apertures.

5. The oscillating structure according to claim 1, wherein said second and third physical layer structures extend along the axis of rotation, and wherein said first physical layer structure extends along a respective axis orthogonal to the axis of rotation.

6. The oscillating structure according to claim 1, wherein said first, second, and third physical layer structures are arranged such as to maximize distance between each other.

7. The oscillating structure according to claim 1, wherein the coupling structure includes an elliptical annular portion, said first, second, and third physical layer structures being arranged at vertices of a cross formed by a minor axis and a major axis of an ellipse describing the elliptical annular portion.

8. The oscillating structure according to claim 1, wherein the coupling structure includes a quadrangular annular portion with beveled corners, said first, second, and third physical layer structures including midpoints of large and small sides of a quadrangle describing said quadrangular annular portion.

9. The oscillating structure according to claim 1, wherein perimeter regions of the coupling structure, at the first physical layer structure, is arranged above the moving element.

10. The oscillating structure according to claim 1, wherein outer edges of the coupling structure, at the first physical layer structure, coincide, at at least one point, with respective outer edges of a central portion.

11. The oscillating structure according to claim 1, wherein the coupling structure also includes a support portion lying in the second plane.

12. The oscillating structure according to claim 1, wherein the moving element contains a reflective element, said oscillating structure forming a micro-mirror.

13. An optical device, including the micro-mirror according to claim 12.

14. The optical device according to claim 13, further including:
    a light source configured to generate a light beam that is incident on said reflective element, and
    an image generation module operatively coupled to said oscillating structure to generate part of an image associated with a light beam reflected by said reflective element.

15. A method of manufacturing an oscillating structure, comprising the steps of:
    forming first and second torsional elastic elements defining an axis of rotation, and
    forming a moving element positioned between said first and second torsional elastic elements, the moving element being configured to rotate about an axis of rotation as a result of a twisting of the first and second torsional elastic elements, wherein the moving element, the first torsional elastic element and the second torsional elastic element lie on a first plane, wherein the first torsional elastic element, the second torsional elastic element and the moving element are arranged at a distance from one another, forming a coupling structure in a second plane other than said first plane, and forming first, second, and third physical layer structures lying in a third plane between the first and second planes and spaced apart from one another by free space, the first physical layer structure linking the coupling structure with the moving element, the second physical layer structure linking the coupling structure with the first torsional elastic element, and the third physical layer structure linking the coupling structure with the second torsional elastic element.

16. The method according to claim 15, wherein the step of forming the coupling structure includes the step of forming an annular portion that contains one or more through-hole apertures.

17. The method according to claim 15, further including the step of matching, at at least one point of the first physical layer structure, outer edges of the coupling structure with respective outer edges of a central portion.

18. The method according to claim 15, wherein the steps of forming the first torsional elastic element, the second torsional elastic element, the moving element and the first, second, and third physical layer structures include processing a silicon-over-insulator (SOI) wafer.

* * * * *